United States Patent
Koga

(10) Patent No.: US 10,950,874 B2
(45) Date of Patent: Mar. 16, 2021

(54) GASKET MANUFACTURING METHOD

(71) Applicant: NOK CORPORATION, Tokyo (JP)

(72) Inventor: Shotaro Koga, Kikugawa (JP)

(73) Assignee: NOK CORPORATION

( * ) Notice: Subject to any disclaimer, the term of this patent is extended or adjusted under 35 U.S.C. 154(b) by 122 days.

(21) Appl. No.: 16/304,608

(22) PCT Filed: Apr. 11, 2017

(86) PCT No.: PCT/JP2017/014788
§ 371 (c)(1),
(2) Date: Nov. 26, 2018

(87) PCT Pub. No.: WO2017/212775
PCT Pub. Date: Dec. 14, 2017

(65) Prior Publication Data
US 2019/0296370 A1    Sep. 26, 2019

(30) Foreign Application Priority Data

Jun. 10, 2016    (JP) .............................. JP2016-116062

(51) Int. Cl.
*H01M 8/0276* (2016.01)
*F16J 15/08* (2006.01)
(Continued)

(52) U.S. Cl.
CPC ........... *H01M 8/0276* (2013.01); *F16J 15/06* (2013.01); *F16J 15/08* (2013.01); *H01M 8/0271* (2013.01);
(Continued)

(58) Field of Classification Search
CPC ................ H01M 8/0271; H01M 8/0276; F16J 2015/0856; F16J 2015/0868
See application file for complete search history.

(56) References Cited

U.S. PATENT DOCUMENTS 6,502,830 B2 *   1/2003   Teranishi ............. F16J 15/0818
                                              277/591
7,431,306 B2 *  10/2008   Ueta .................... F16J 15/0818
                                              277/593
(Continued)

FOREIGN PATENT DOCUMENTS

CN      101540401 A    9/2009
EP        0269641 A1    6/1988
(Continued)

OTHER PUBLICATIONS

Extended European Search Report for Application No. EP 17 80 9958.6 dated May 15, 2019 (6 pages).
(Continued)

*Primary Examiner* — Nicholas L Foster
(74) *Attorney, Agent, or Firm* — Harness, Dickey & Pierce, P.L.C.

(57) ABSTRACT

A gasket manufacturing method is provided. The gasket has a base material with a bead and an elastomeric gasket body disposed in a top portion of the bead. The method includes sequentially forming the bead on one part of a plane of the base material and applying a molding material of the gasket body to the top of the bead. When forming the bead on the one part of the plane, a protrusion is formed in each end in the width direction in the top of the bead. The protrusions are utilized as a coating width defining means of the molding material when applying the molding material to the top of the bead.

2 Claims, 4 Drawing Sheets

(51) Int. Cl.
*H01M 8/0271* (2016.01)
*F16J 15/06* (2006.01)
(52) U.S. Cl.
CPC ...... *F16J 15/061* (2013.01); *F16J 2015/0856* (2013.01); *Y02P 70/50* (2015.11)

(56) References Cited

U.S. PATENT DOCUMENTS

| | | | | |
|---|---|---|---|---|
| 7,749,636 | B2* | 7/2010 | Scherer | H01M 8/028 429/469 |
| 8,227,145 | B2* | 7/2012 | Keyser | H01M 8/0204 429/518 |
| 8,459,657 | B2* | 6/2013 | Ueta | F16J 15/0818 277/594 |
| 8,603,704 | B2* | 12/2013 | Keyser | H01M 8/0204 429/518 |
| 8,609,298 | B2* | 12/2013 | Skala | H01M 8/0271 429/508 |
| 8,679,697 | B1* | 3/2014 | Skala | H01M 8/0276 429/460 |
| 10,297,811 | B2* | 5/2019 | Xi | H01M 8/0297 |
| 2006/0105221 | A1* | 5/2006 | Scherer | H01M 8/028 429/483 |
| 2009/0045590 | A1* | 2/2009 | Ueta | F16J 15/0818 277/595 |
| 2009/0239128 | A1 | 9/2009 | Keyser et al. | |
| 2011/0195332 | A1* | 8/2011 | Goebel | H01M 8/0232 429/465 |
| 2012/0164560 | A1* | 6/2012 | Keyser | H01M 8/0267 429/516 |
| 2013/0045434 | A1* | 2/2013 | Skala | H01M 8/0271 429/465 |
| 2014/0065509 | A1* | 3/2014 | Skala | H01M 8/0271 429/460 |
| 2019/0088919 | A1* | 3/2019 | Xi | H01M 2/263 |

FOREIGN PATENT DOCUMENTS

| | | | |
|---|---|---|---|
| EP | 2696418 | A1 | 2/2014 |
| JP | 2000-065211 | A | 3/2000 |
| JP | 2003-214254 | A | 7/2003 |
| JP | 2005-005012 | A | 1/2005 |
| JP | 2007-292274 | A | 11/2007 |
| JP | 2008-232159 | A | 10/2008 |
| JP | 2015-191802 | A | 11/2015 |
| WO | 87/07335 | A1 | 12/1987 |
| WO | WO-2015177365 | A1* | 11/2015 .......... H01M 8/0267 |

OTHER PUBLICATIONS

European Office Action for corresponding Application No. EP 17809958.6 dated Jul. 1, 2020 (6 pages).
European Office Action for Patent Application No. EP 17809958.6 dated Jul. 1, 2020 (6 pages).

* cited by examiner

GASKET MANUFACTURING METHOD

CROSS REFERENCE TO RELATED APPLICATIONS

This application is a U.S. National Stage application of International Application No. PCT/JP2017/014788 filed on Apr. 11, 2017 and published in Japanese as WO 2017/212775 on Dec. 14, 2017 and claims priority to Japanese Patent Application No. 2016-116062 filed on Jun. 10, 2016. The entire disclosures of the above applications are incorporated by reference herein.

BACKGROUND

Technical Field

The present invention relates to a gasket manufacturing method relating to a sealing technique. The gasket of the present invention is used as a fuel cell gasket, for example.

Related Art

Heretofore, a gasket 51 is known which has a structure in which a base material 52 of a plate shape containing a metal plate or the like is provided, a bead portion 53 of a solid shape is provided on one part of a plane of the base material 52, and a gasket body 54 formed of a rubber-like elastic body is disposed in a top portion 53a of the bead portion 53 and which contains a combination of the base material 52 and the gasket body 54 as illustrated in FIG. 4.

The base material 52 is used as a fuel cell separator, for example. In the fuel cell separator, seal lines S are set so as to surround the periphery of a fuel cell reaction surface 55 and the periphery of each manifold hole 56 as illustrated in FIG. 5. Accordingly, the bead portion 53 is provided and the gasket body 54 is disposed along the seal lines S.

As a procedure of manufacturing the above-described gasket 51, a process of forming the bead portion 53 on the one part of the plane of the base material 52 and a process of applying a molding material (liquid rubber or the like) of the gasket body 54 to the top portion 53a of the bead portion 53, and then molding the gasket body 54 are sequentially performed.

However, there is room for further improvement in the above-described prior-art technique in the following respects.

More specifically, according to the prior-art technique, the top portion 53a of the bead portion 53 provided on the one part of the plane of the base material 52 is formed into a flat surface shape over the entire width thereof as illustrated in the figure.

Therefore, in the process of applying the molding material of the gasket body 54 to the top portion 53a of the bead portion 53, the coating width of the molding material may not be constant due to surface tension. In this case, the coating thickness of the molding material is also not constant, and thus the cross-sectional shape of the gasket body 54 is not constant. Therefore, the sealability by the gasket body 54 may be affected (In general, the coating amount of the molding material is a fixed amount, and therefore, when the coating width is wide, the coating thickness is thin and, when the coating width is narrow, the coating thickness is thick. The prior-art technique cannot sufficiently control the width dimension and the thickness dimension, i.e., the coating shape of the molding material.).

Moreover, in the process of applying the molding material of the gasket body 54 to the top portion 53a of the bead portion 53, the molding material partially bulges out in the width direction from the top portion 53a of the bead portion 53 (flows in a direction indicated by an arrow x) as illustrated in FIG. 6. In this case, a gasket molding defect occurs.

In view of the above-described circumstances, it is an object of the present invention to provide a gasket manufacturing method capable of making the coating width of a gasket body molding material in a top portion of a bead portion constant or substantially constant and also capable of preventing the molding material from bulging out.

SUMMARY OF THE INVENTION

In order to achieve the above-described object, a gasket manufacturing method of the present invention is a method for manufacturing a gasket provided with a base material provided with a bead portion on one part of a plane and a gasket body formed of a rubber-like elastic body disposed in a top portion of the bead portion and the method includes sequentially performing a process of forming the bead portion on the one part of the plane of the base material and a process of applying a molding material of the gasket body to the top portion of the bead portion, in which, when forming the bead portion on the one part of the plane of the base material, a protrusion portion is formed in each end portion in the width direction in the top portion of the bead portion and the protrusion portions are utilized as a coating width defining means of the molding material when applying the molding material to the top portion of the bead portion.

In the present invention having the above-described configuration, when forming the bead portion on the one part of the plane of the base material, the protrusion portion is formed in each end portion in the width direction in the top portion of the bead portion and the protrusion portions are utilized as the coating width defining means of the molding material when applying the molding material of the gasket body to the top portion of the bead portion, and therefore the protrusion portions block the flow (spread in the width direction) of the molding material and define the coating width. Therefore, the coating width of the molding material can be made constant or substantially constant and the molding material can be prevented from bulging out. The base material is used as a fuel cell separator, for example. In this case, the gasket is used as a fuel cell gasket.

Effect of the Invention

In the present invention, the coating width of the gasket body molding material in the top portion of the bead portion can be made constant or substantially constant and the molding material can be prevented from bulging out. Therefore, the cross-sectional shape of the gasket body is constant or substantially constant, so that the sealability by the gasket body can be stabilized, and thus the occurrence of a molding defect due to the bulging-out of the molding material can be prevented.

DETAILED DESCRIPTION OF THE PREFERRED EMBODIMENTS (1) The present invention relates to a fuel cell gasket or a metal gasket.

(2) As the fuel cell gasket, a bead is formed in a separator, and then rubber is applied onto the bead and molded, whereby a cost reduction is expected. In this case, a flat shape is adopted for the bead surface. However, when a gasket is formed using a liquid rubber material by liquid application, such as a screen printing system, the coating cross-sectional shape cannot be controlled due to the surface tension between the rubber material and a base material, and thus the sealability is problematic (Variations in the coating width and height of rubber occur.).

(3) Then, the present invention stabilizes the coating shape of the liquid rubber material by forming end portions of a bead shape formed in the separator into a protrusion shape. The seal shape can be controlled, and therefore an improvement of the sealability quality can be achieved. A fuel cell gasket has a feature that the separator bead cross-sectional end portions are formed into the protrusion shape. The variation in the rubber height can be prevented without being affected by the surface tension between the base material and the rubber material.

Hereinafter, an embodiment of the present invention is described according to the drawings.

Figure 1:
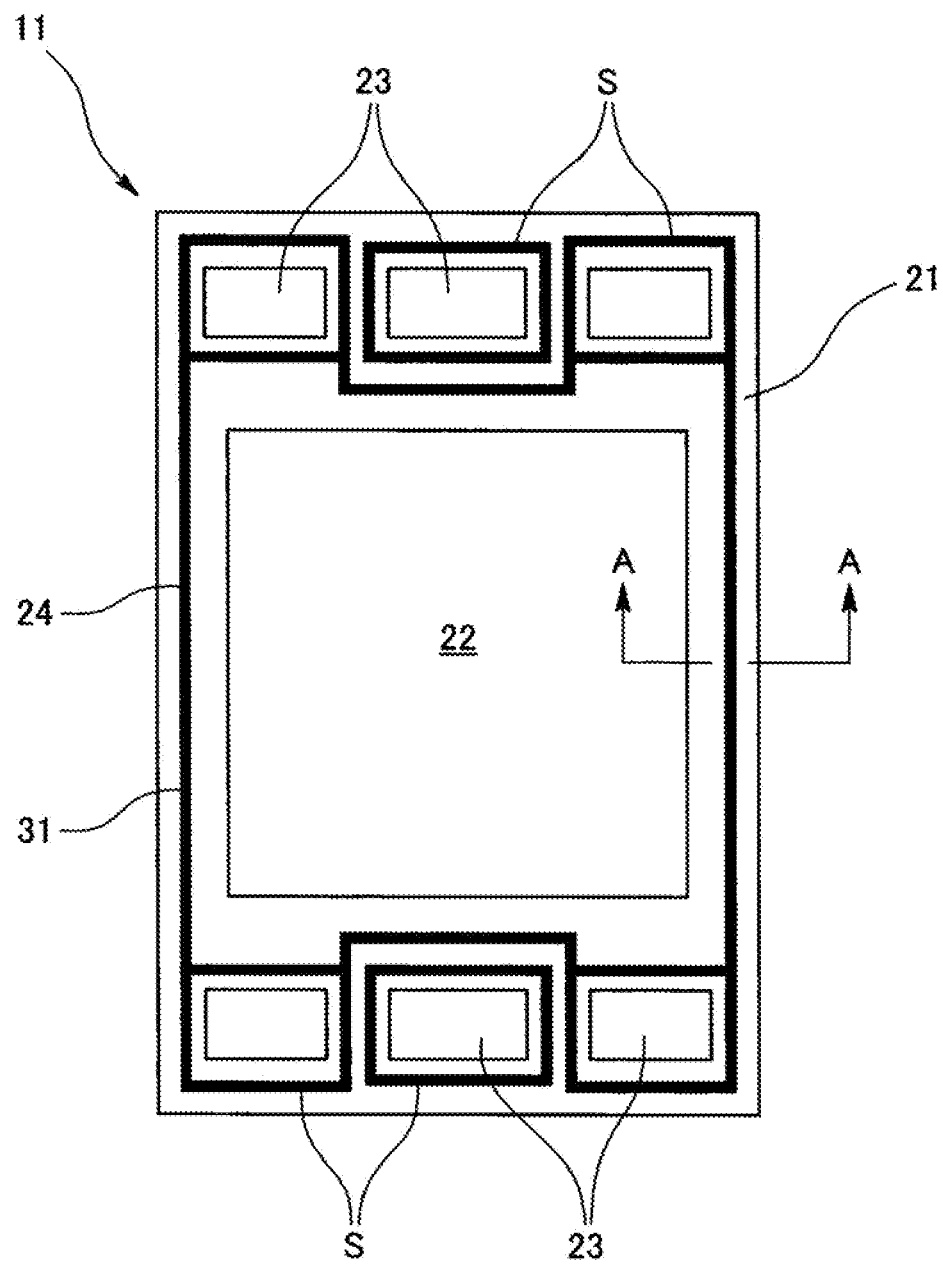
FIG. 1 is a plan view of a gasket according to an embodiment of the present invention.

FIG. 1 illustrates a plane of an entire gasket 11 manufactured by a manufacturing method according to an embodiment of the present invention. The gasket 11 is used as a fuel cell gasket. The gasket 11 has a fuel cell reaction surface 22 and a plurality of manifold holes 23 on a plane of a fuel cell separator 21 containing a metal plate as a base material, and therefore seal lines S are set on the peripheries thereof.

Figure 2:
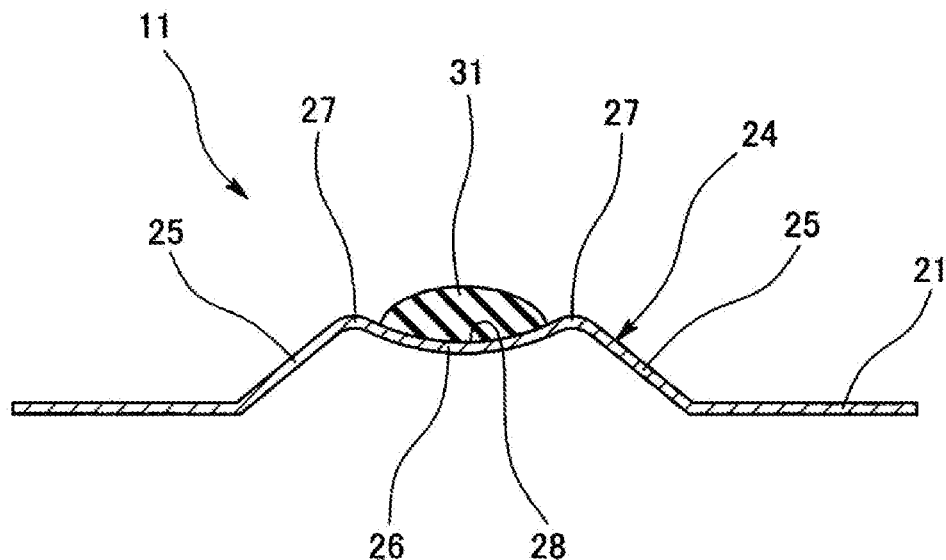
FIG. 2 is a cross-sectional view of a principal portion illustrating an example of the cross-sectional shape of the gasket and is an enlarged cross-sectional view along the A-A line of FIG. 1.

As illustrated in the enlarged cross section of FIG. 2, a bead portion 24 having a solid shape is integrally provided in the seal line S. The bead portion 24 is formed into a full bead shape having a cross section of a substantially trapezoid shape, i.e., a shape in which a top portion 26 is provided between a pair of inclined surface portions 25 in the width direction. The bead portion 24 is provided over the entire length of the seal line S. The bead portion 24 projects in one direction (upward in the figure) in the thickness direction of the separator 21.

A protrusion portion 27 is integrally provided in each end portion in the width direction in the top portion 26 of the bead portion 24. The protrusion portions 27 are provided over the entire length of the bead portion 24. The protrusion portions 27 project in one direction (upward in the figure) in the thickness direction of the separator 21. The protrusion portion 27 is provided in each end portion in the width direction of the top portion 26, and therefore a center portion in the width direction of the top portion 26 is relatively formed into a recessed portion 28. The recessed portion 28 is also provided over the entire length of the bead portion 24.

A gasket body 31 containing a rubber-like elastic body is provided in the recessed portion 28, i.e., upper surface of the top portion 26 and between the pair of protrusion portions 27 in the width direction. The gasket body 31 is molded by applying a molding material by a means, such as a dispenser method. The gasket body 31 is provided over the entire length of the seal lines S.

In manufacturing the above-described gasket 11, the bead portion 24 is formed on the one part of the plane of the separator 21 by press processing or the like, and the protrusion portions 27 are simultaneously formed at this time.

Subsequently, the molding material (liquid rubber or the like) of the gasket body 31 is applied to the upper surface of the top portion 26 of the bead portion 24 by a means, such as the dispenser method, and a coating process is performed utilizing the protrusion portions 27 as the coating width defining means of the molding material at this time.

Therefore, according to this method, the protrusion portions 27 block the flow (spread in the width direction) of the molding material and define the coating width in the coating process of the molding material described above. Therefore, the coating width is made constant or substantially constant and, when the coating width is made constant or substantially constant, the coating thickness is also made constant or substantially constant because the coating amount is a fixed amount. Accordingly, the cross-sectional shape of the gasket body 31 is made constant or substantially constant, and therefore the sealability by the gasket body 31 can be stabilized and the occurrence of a molding defect by the bulging-out of the molding material can be prevented.

In FIG. 2, although the cross-sectional shape of the protrusion portions 27 is formed into an arc shape and the cross-sectional shape (cross-sectional shape of the bottom surface of the recessed portion 28) of the top portion 26 is also formed into an arc shape, the cross-sectional shapes thereof may be linear shapes or may contain a combination of a plurality of straight lines.

Figure 3:
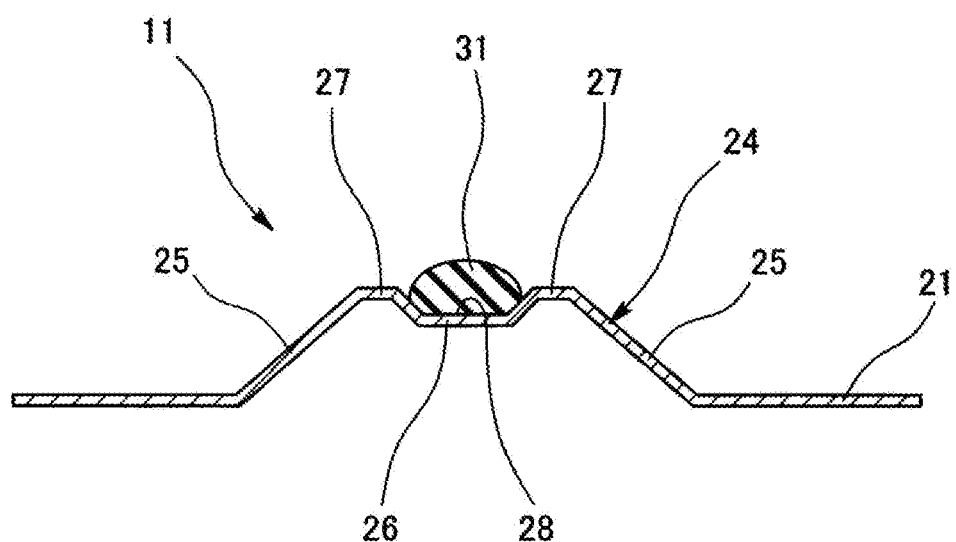
FIG. 3 is a cross-sectional view of a principal portion illustrating another example of the cross-sectional shape of the gasket and is an enlarged cross-sectional view along the A-A line of FIG. 1.
Figure 4:
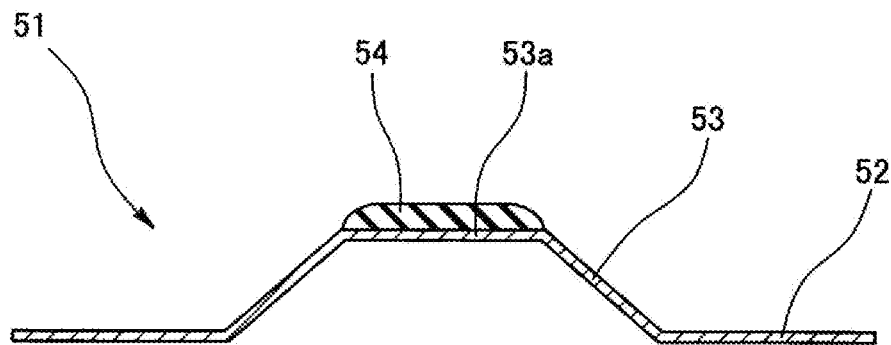
FIG. 4 is a cross-sectional view of a principal portion of a gasket according to a prior-art embodiment.
Figure 5:
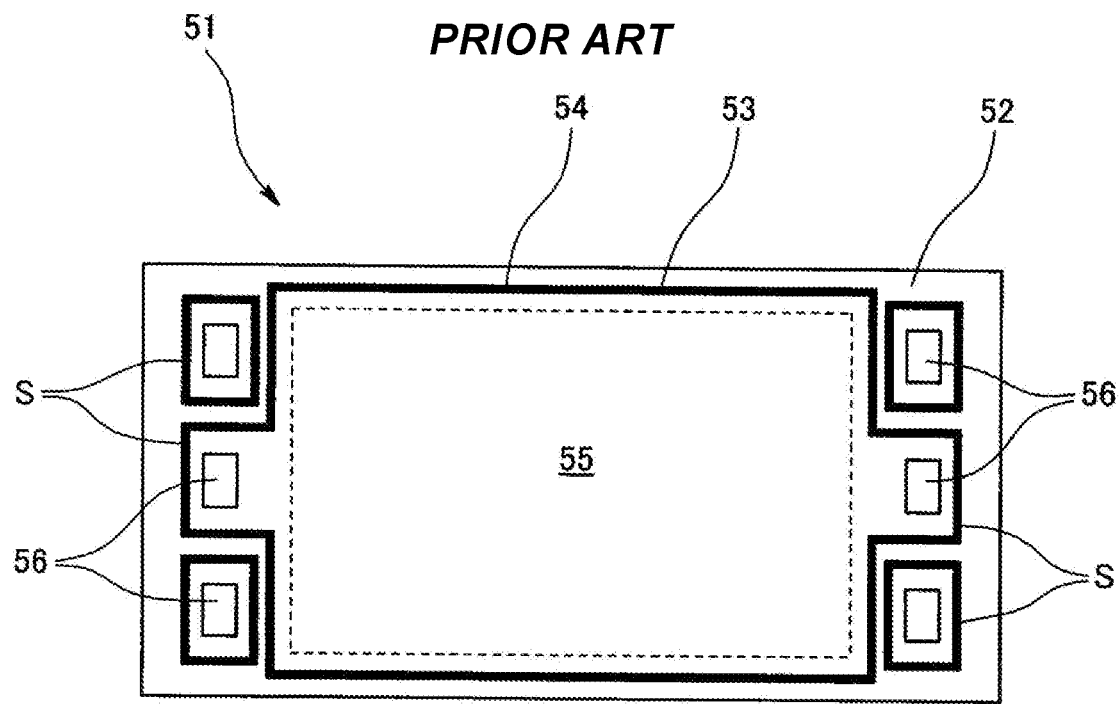
FIG. 5 is a plan view of the gasket.
Figure 6:
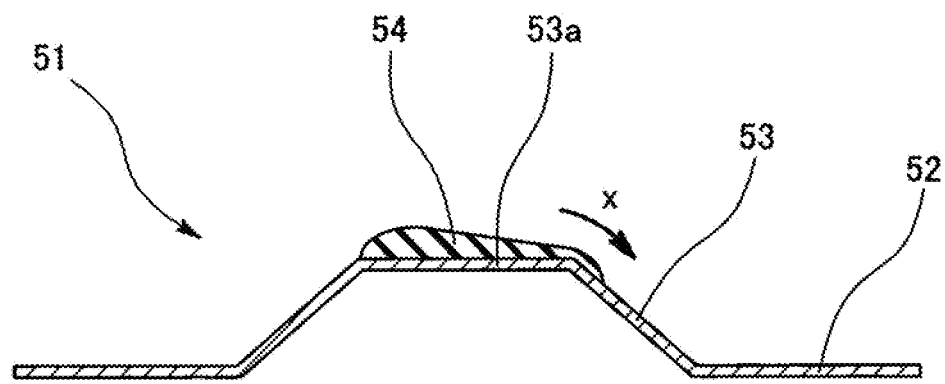
FIG. 6 is an explanatory view illustrating a molding defect in the gasket.

As an example in this case, the cross-sectional shape of the protrusion portions 27 is formed into a trapezoid shape and the cross-sectional shape (cross-sectional shape of the bottom surface of the recessed portion 28) of the top portion 26 is formed into a flat and linear shape in FIG. 3.

As a matter common to the example of FIG. 2 and the example of FIG. 3, it is preferable that the height of the protrusion portion 27 is smaller than the thickness of the gasket body 31, and thus the gasket body 31 can be certainly brought into contact with the mating surface in assembling a fuel cell stack.

The invention claimed is:

1. A gasket manufacturing method, the gasket comprising a base material provided with a bead portion on one part of a plane and a gasket body formed of a rubber-like elastic body disposed in a top portion of the bead portion, the method comprising:

sequentially performing a process of forming the bead portion on the one part of the plane of the base material, and a process of applying a molding material of the gasket body to the top portion of the bead portion, wherein the bead portion includes pair upwardly extending inclined surface portions that each terminate at a projection portion defined by a planar surface that extends in a direction parallel with a plane defined by the base material, the planar surface of each projection portion terminating at a downwardly extending inclined surface portion that each terminate at a planar recessed portion that is located between each of the downwardly extending inclined surface portions, the protrusion portions are utilized to define a coating width of the molding material when the molding material is applied to the planar recessed portion that is located between each of the downwardly extending inclined surface portions, a length of the upwardly extending inclined surface portions being greater than a length of the downwardly extending inclined surface portions, and a length of the planar surface of the projection portion being less than a length of the planar recessed portion.

2. The gasket manufacturing method according to claim 1, wherein the base material is a fuel cell separator.

\* \* \* \* \*